United States Patent [19]

Nishii et al.

[11] Patent Number: 5,362,525
[45] Date of Patent: Nov. 8, 1994

[54] PROCESS FOR MODIFYING FLUORINE RESIN SURFACES

[75] Inventors: Masanobu Nishii, Kyoto; Yuichi Shimizu, Mino; Shunichi Kawanishi, Neyagawa; Shunichi Sugimoto, Hirakata; Tadaharu Tanaka, Neyagawa; Yosuke Eguchi, Takatsuki, all of Japan

[73] Assignees: Kurashiki Boseki Kabushiki Kaisha, Kurashiki; Japan Atomic Energy Research Institute, Tokyo; Radiation Application Development Association, Tokai, all of Japan

[21] Appl. No.: 162,702

[22] Filed: Dec. 7, 1993

[30] Foreign Application Priority Data

Dec. 8, 1992 [JP] Japan .................................. 4-327822

[51] Int. Cl.5 .............................................. B05D 3/02
[52] U.S. Cl. .................................. 427/554; 427/444; 427/558; 427/581; 427/596
[58] Field of Search ............... 427/554, 558, 444, 596, 427/581

[56] References Cited

FOREIGN PATENT DOCUMENTS 53-22108  7/1978  Japan .
2-196834  8/1990  Japan .
3-57143   8/1991  Japan .
5-125208  3/1993  Japan .

OTHER PUBLICATIONS

Kogyo Zairyo [Engineering Material]. vol. 29 (No. 2), 1981, pp. 105–113.
Industrial and Engineering Chemistry, vol. 50, No. 3, 1958(Mar.), pp. 329–330, Nelson et al.

*Primary Examiner*—Bernard Pianalto
*Attorney, Agent, or Firm*—Wegner, Cantor, Mueller & Player

[57] ABSTRACT

A process for modifying surfaces of fluorine resins including irradiating an ultraviolet laser beam on the surfaces in the presence of an inorganic silicon compound. The inorganic silicon compound could be a silicate, silicon oxide, silicon nitride, or silicon carbide.

5 Claims, No Drawings

PROCESS FOR MODIFYING FLUORINE RESIN SURFACES

FIELD OF THE INVENTION

The present invention relates to a novel process for modifying the chemically inactive surfaces of the fluorine resins.

BACKGROUND OF THE INVENTION

Fluorine resins are fit for various uses because they have superior properties (e.g. oil and water repellency, sliding property, stain resistance, heat resistance, chemical resistance and electrical properties) in comparison with other resins. However the fluorine resins have disadvantages that it is difficult to apply adhesives, coatings and the like to the fluorine resins or to laminate the fluorine resins with other materials, said disadvantages being attributable to the inactive surface of the fluorine resins.

Various processes for modifying the surfaces of the fluorine resins have hitherto been proposed. For example, E. R. Nelson et. al. (Ind. Eng. Chem., vol. 50, 1958, pp. 329–330) describe the use of a complex solution prepared from a tetrahydrofuran solution of metallic sodium and naphthalene. In this technique, not only it causes trouble from the viewpoint of working hygiene because the complex solution is unstable and liable to cause ignition during the treatment of the fluorine resins, but also adhesive and wetting properties like of the modified surfaces of the fluorine resins decrease remarkably under the condition of sunlight exposure or high temperature.

Tsunoda et. al. [Kogyo Zairyo (Engineering Materials), vol. 29 (No. 2), 1981, p. 105] describe the use of a glow discharge. In this technique, a modification effect of the surfaces of the fluorine resins is remarkably inferior to that of nonfluorine resins such as polyethylene and the like.

Japanese Patent Publication (KOKOKU) No. 22108/1978 describes the use of a high frequency sputter etching under low pressure. In this method, there are several disadvantages that (i) a treating speed is slow, (ii) resinous residues formed during the sputter etching are deposited to inner parts of an expensive, large-sized treating apparatus with a vacuum system, and (iii) an abrasionable, irregular surfaces of the fluorine resins do not bring about sufficient adhesive properties and application properties of coatings for low fluidable adhesives, coatings and the like.

Japanese Patent Publication(KOKAI) No. 196834/1990 describes the use of laser beam in a special gaseous atmosphere such as B(CH$_3$)$_3$ and Al(CH$_3$)$_3$. According to this method, a treating speed is slow, and a strong poisonous gas and an expensive, large-sized treating apparatus are inevitably required.

Japanese Patent Publication (KOKOKU) No. 57143/1991 describes the use of excimer laser beam, said laser beam being directly irradiated to the fluorine resins. According to this technique, adhesive and wetting properties of the surfaces of the fluorine resins cannot sufficiently be improved.

According to the method described in Japanese Patent Publication(KOKAI) No. 125208/1993, the adhesive and wetting properties of the surfaces of the fluorine resins can be sharply improved. However this method cannot be applied to a surface modification of ready-made molded articles made of fluorine resins because a laser beam must be irradiated after a light-absorbing material is kneaded in the fluorine resins.

SUMMARY OF THE INVENTION

The present invention relates to an improvement of the process for modifying the surfaces of the fluorine resins disclosed in Japanese Patent Publication(KOKAI) No. 125208/1993. In other words, the object of the present invention is to provide an improved process for modifying the surfaces of the fluorine resins which remarkably increases the adhesive and wetting properties and the like of the surfaces of the fluorine resins, said improved process being generally applied to the surface modification of the fluorine resins.

Accordingly the present invention concerns a process for modifying the surfaces of the fluorine resins comprising irradiating an ultraviolet laser beam on said surfaces in the presence of an inorganic silicon compound.

DETAILED DESCRIPTION OF THE INVENTION

Any organic polymer containing fluorine atoms may be used as the fluorine resins in the above process. Following resins are exemplified as preferred fluorine resins: polytetrafluoroethylene (PTFE), copolymer of tetrafluoroethylene with perfluoroalkoxyethylene (PFA), copolymer of tetrafluoroethylene with hexafluoropropylene (FEP), terpolymer of tetrafluoroethylene with hexafluoropropylene and perfluoroalkoxyethylene (EPE), copolymer of tetrafluoroethylene with ethylene(ETFE), polychlorotrifluoroethylene (PCTFE), copolymer of trifluorochloroethylene with ethylene (ECTFE), polyvinylidene fluoride (PVDF) and polyvinyl fluoride (PVF). Any mixture of the aforesaid fluorine resins may be employed in the above process.

Although concrete shapes or forms of the fluorine resins to be treated by the process according to the present invention are not limited, molded articles having any figure, such as sheets, films, pipes, porous membranes and the like are exemplified.

As the inorganic silicon compound which may be used in the present invention, silicates (e.g. sodium silicate, potassium silicate, lithium silicate, ammonium silicate and the like), silicon oxide, silicon nitride, silicon carbide and the like are exemplified, said silicates being preferred.

An existential embodiment of the inorganic silicon compound on the surfaces of the fluorine resins is not limited. Fine powder of the inorganic silicon compound may be directly spreaded on the surfaces of the fluorine resins. However, from the viewpoint of modification efficiency of the surfaces, workability and the like, it is preferable to contact an aqueous solution, dispersion or suspension of the inorganic silicon compound with the surfaces of the fluorine resins, said aqueous solution being particularly preferred. Concentration of the aqueous solution is under the control of the kinds of the inorganic compounds and the wavelengths of the ultraviolet laser beam employed. For example, in the case where ArF-eximer laser beam is employed as the ultraviolet laser beam, 1 wt %-aqueous solution of sodium metasilicate or 10 wt %-aqueous solution of water-glass brings about a remarkable modification effect of the surfaces of the fluorine resins. As the concrete embodiments for contacting the aqueous liquids of the inorganic silicon compounds with the surfaces of the fluorine resins, the following methods are exemplified: floating of the films and the like made of the fluorine resins on said aqueous liquids, impregnation of the porous membranes and the like made of fluorine resins with said aqueous liquids, filling of the pipes made of the fluorine resins with said aqueous liquids, and so forth.

In the present invention, the surfaces of the fluorine resins can be modified by irradiating the ultraviolet laser beam on said surfaces under the condition that the inorganic silicon compounds contact with said surfaces. The ultraviolet laser beams having a wavelength of less than 400 nm are preferred. In particular, KrF-excimer laser beam (wavelength: 248 nm) and ArF-excimer laser beam (wavelength: 193 nm) are preferable because they are produced in a stable high-output for a long-time. The ultraviolet laser beam may usually be irradiated under atmospheric conditions, but an oxygen atmosphere may be employed for the irradiation of said laser beam. The irradiation conditions of the ultraviolet laser beam may be influenced by the kinds of the fluorine resins and the inorganic silicon compounds as well as the desired modification degree of the surfaces of the fluorine resins. In general, a fluence is more than about 10 $mJ/cm^2$/pulse and a shot number is less than about 5000.

According to the present invention, the chemically inactive surfaces of the fluorine resins can be effectively modified without deteriorating the characteristics of the fluorine resins such as the heat resistance, the chemical resistance, electrical properties and the like. The surface modification produces the remarkable improvements in the wetting properties, the adhesive properties, the printability, the application properties of coatings. Therefore the added values of the molded articles and the like made of the fluorine resins whose surfaces are modified by the present invention increase rapidly because said molded articles and the like can be subjected to the secondary processings such as various printing and application treatments, lamination with other resins or inorganic materials, and so forth.

EXAMPLES

Example 1

The porous PTFE membrane (mean pore size: 0.1 μm, diameter: 47 mm, thickness: 0.045 mm) impregnated with 10% aqueous solution of water-glass was floated on said aqueous solution. From the upper side, ArF-excimer laser beam (wavelength: 193 nm) was irradiated on the surface of the floated membrane (fluence: 100 $mJ/cm^2$/pulse, total energy: 10.6 $J/cm^2$). The treated membrane was sufficiently washed with pure water, dried, and then subjected to the following measurement of the wetting properties.

The wetting properties of the membrane were measured with a standard solution for a wetting index prepared according to JIS K-6768 specification. The standard solution consists of a series of mixed solutions whose surface tensions vary successively. The mixed solutions were successively dropped on the membrane in an ascending order of the surface tensions. The wetting index of the membrane was evaluated as the maximum surface tension of the mixed solution which wets the membrane, said surface tension being 44 dyn/cm. On the other hand, the wetting index of an untreated porous PTFE membrane was less than 31 dyn/cm. These results show that the wetting properties of the surface of the PTFE membrane was remarkably improved by the process according to the present invention.

The X-ray photoelectron spectroscopic analysis of the treated membrane showed a formation of polar carbonyl group on the surface thereof. The electron microscopical observation indicated no structural changes of the treated membrane.

Example 2

The procedure was the same as for Example 1, except for using KrF-excimer laser beam (wavelength: 248 nm, fluence: 410 $mJ/cm^2$/pulse, total energy: 20.6 $J/cm^2$). The wetting index of the treated porous PTFE membrane was 41 dyn/cm.

Example 3

The procedure was the same as for Example 1, except for using 1% aqueous solution of sodium metasilicate. The irradiation conditions of ArF-excimer laser beam (wavelength: 193 nm) were as follows:

| fluence | 220 $mJ/cm^2$/pulse |
|---|---|
| total energy | 10.2 $J/cm^2$ |

The wetting index of the treated porous PTFE membrane was 43 dyn/cm.

Example 4

The procedure was the same as for Example 1, except for irradiating ArF-excimer laser beam (wavelength: 193 nm) on the dried porous PTFE membrane which was previously impregnated with 10% aqueous solution of water-glass. The irradiation conditions of the laser beam were the same as that described in Example 3. The wetting index of the treated porous PTFE membrane was 33 dyn/cm.

Example 5

The FEP film (diameter: 47 mm, thickness: 0.100 mm) was floated on 10% aqueous solution of water-glass. From the upper side, ArF-excimer laser beam (wavelength: 193 nm) was irradiated on the surface of the floated film (fluence: 220 $mJ/cm^2$/pulse, total energy: 10.2 $J/cm^2$).

The treated film was sufficiently washed with pure water, dried, and then subjected to the measurement of contact angle against water. The contact angle was measured by means of the apparatus for measuring a contact angle "FACE CA-A" manufactured by Kyowa Kaimenkagaku Inc., Japan. The contact angle against water of the treated FEP film was 90°. On the other hand, the contact angle against water of an untreated FEP film was 112°. These results show that the wetting properties of the surface of the FEP film was remarkably improved by the process according to the present invention.

Comparative Example 1

From the upper side, ArF-excimer laser beam (wavelength: 193 nm) was irradiated on the surface of the porous PTFE membrane (mean pore size: 0.1 μm, diameter: 47 mm, thickness: 0.045 mm). The irradiation conditions of the laser beam was the same as that described in

Example 1

The wetting index of the treated porous PTFE membrane was measured according to the method described in Example 1, said wetting index being less than 31 dyn/cm.

Comparative Example 2

The procedure was the same as for Comparative Example 1, except for using KrF-excimer laser beam (wavelength: 248 nm, fluence: 410 mJ/cm$_2$/pulse, total energy: 20.6 J/cm$_2$). The wetting index of the treated porous PTFE membrane was less than 31 dyn/cm.

We claim:

1. A process for modifying surfaces of fluorine resins comprising irradiating an ultraviolet laser beam on said surfaces in the presence of an inorganic silicon compound selected from the group consisting of silicates, silicon oxide silicon nitride and silicon carbide.

2. The process according to claim 1, wherein an aqueous solution of the inorganic silicon compound is in contact with the surfaces of the fluorine resins.

3. The process according to claim 2, wherein the inorganic silicon compound is a silicate.

4. The process according to claim 2, wherein the ultraviolet laser beam is selected from the group consisting of a KrF-excimer laser beam and an ArF-excimer laser beam.

5. The process according to claim 1, wherein the ultraviolet laser beam is selected from the group consisting of a KrF-excimer laser beam and an ArF-excimer laser beam.

* * * * *